Figure 1:
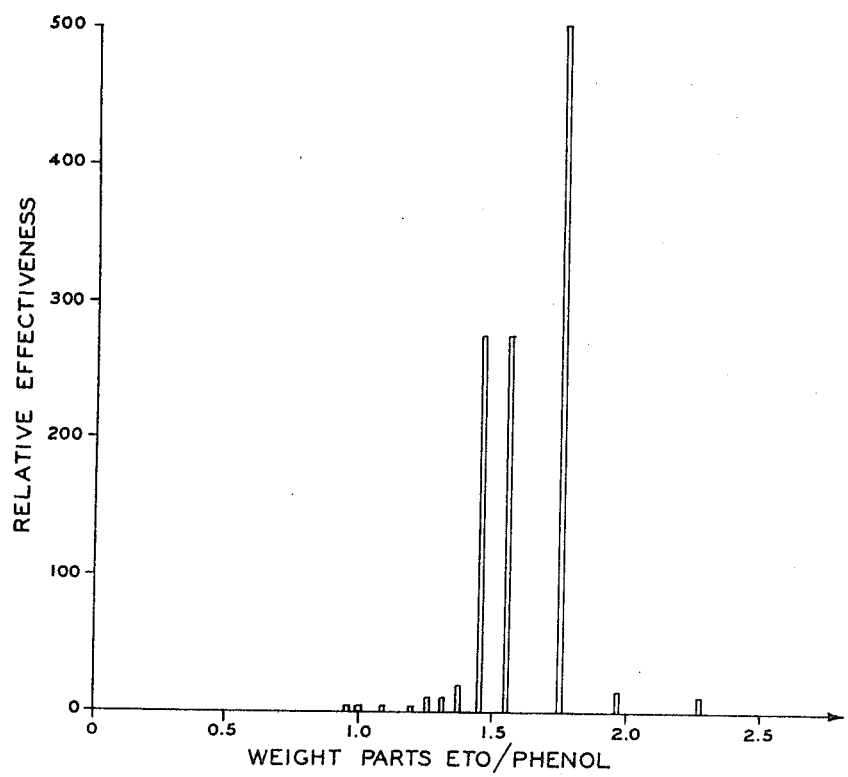

FIG. 4
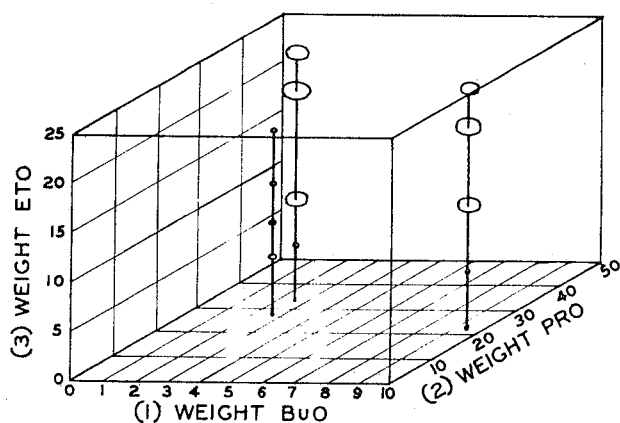
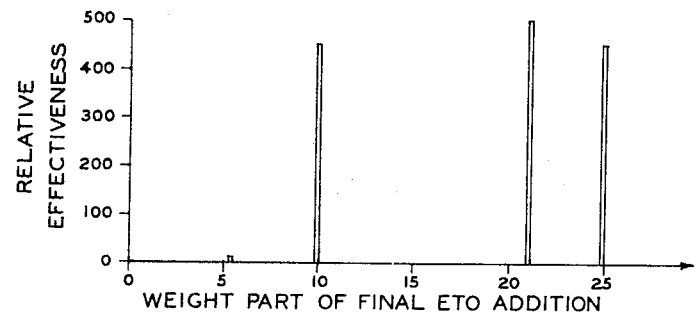
FIG. 5
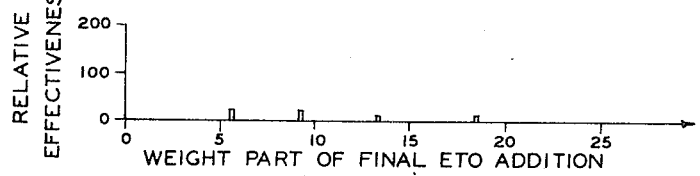
FIG. 6
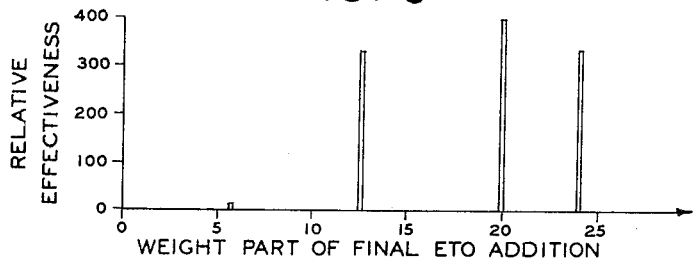
FIG. 7

United States Patent Office 3,352,109
Patented Nov. 14, 1967

3,352,109
HYBRID THIXOTROPIC ROCKET AND JET FUELS COMPRISING OIL IN WATER EMULSIONS
Kenneth J. Lissant, St. Louis, Mo., assignor to Petrolite Corporation, Wilmington, Del., a corporation of Delaware
Continuation of abandoned application Ser. No. 302,177, Aug. 14, 1963. This application May 4, 1966, Ser. No. 547,581.
12 Claims. (Cl. 60—217)

This application is a continuation of my application Ser. No. 302,177 now abandoned, entitled Hybrid Fuels I, filed on Aug. 14, 1963, and is copending with each of the following applications.

Ser. No. 286,877, now abandoned, filed May 20, 1963, titled Stable Emulsions; Ser. No. 302,001, filed Aug. 14, 1963, titled Hybrid Fuel II; Ser. No. 411,103, filed Nov. 13, 1964, titled Emulsion Preparation; Ser. No. 541,738, filed Apr. 11, 1966, titled Treating Thixotropic Emulsions.

This invention relates to high internal phase emulsions; to rocket and jet fuels; and to the use thereof in rocket and jet propulsion. More particularly this invention relates to such fuels having the characteristics of both liquid and solid fuels (i.e. they are hybrid solid-liquid fuels). Still more particularly this invention relates to hybrid solid-liquid fuels which are especially prepared high internal phase emulsions of one combustible material and a second combustible and/or volatile material which is immiscible in said first combustible material, said emulsion being prepared by means of an emulsifying agent which is capable of forming an emulsion having the characteristics of a solid fuel when at rest and a liquid fuel when force is exerted on it, such as by the shear of pumping, mixing, etc. This invention also relates to said hybrid fuels containing certain finely divided solids suspended therein, such as for example, metals, salts, etc.

In the field of rocket and jet fuel propulsion two general types of fuels are used—solid fuels and liquid fuels. Both types have intrinsic advantages and disadvantages. For example it is highly advantageous to combine the storability and stability of solid fuels with the higher specific impulse and controlability of liquid fuels. The hybrid fuels of this invention provide an improved fuel composition combining many advantages of both types of fuel.

Liquid fuels are used in combination with oxidizing agents, such as for example liquid oxygen (LOX), red fuming nitric acid, etc. While these combinations yield high specific impulse, it is also known that if the density of the fuel is increased such as by the use of certain combustible metals or metal compounds suspended in the fuels, and the solid-liquid mixture is used in conjunction with the appropriate oxidizing agent, the combination yields a much higher specific impulse. In practice the use of such combinations presents problems since the solid must be kept uniformly suspended in the liquid to obtain consistent performance. Attempts have been made to suspend solids in liquids by increasing the viscosity of the liquids, for example by the use of polymeric materials, but it was soon discovered that simply increasing the Newtonian viscosity of the liquid does not solve the problem since the settling of the solid was only slowed and not actually prevented. It was found necessary to produce "gels" or thixotropic compositions which under low shear behave like elastic solids and yet, under high shear, flow freely enough to be pumpable.

However, the use of gels only partly solved the problem. If a gel was prepared which is "stiff" enough to suspend the solids, it was often too thick to pump. If a gel was subjected to high shear in pumping or in manufacture, it often permanently lost enough of its gelling action so that it allowed the solids to separate. Since gels are sticky, they do not flow from the fuel tanks cleanly, as much as a 10% hold up having been experienced. In addition, materials used to produce gels are usually difficult to dissolve in the liquid fuel and gels sometimes become "tender" on ageing. Furthermore the reproducibility of properties from batch to batch in gelled compositions is often poor.

A further objection to the use of gels is the mechanism by which the solids are held in suspension. Gels to be used in this type of application must have "yield points," that is they must require a definite initial shearing force before they begin to flow. When at rest they behave like elastic solids and the suspended solids are trapped in the gel matrix. Once they begin to flow, however, or when the yield point is exceeded, the solids can begin to settle.

This invention produces a "stiffened" liquid fuel by an entirely different mechanism. In the practice of this invention an emulsion is made of the principal liquid fuel in a small amount of a second combustible or volatile but immiscible liquid. These emulsions are characterized by having a very low volume percent of external phase, and are highly thixotropic. Although they appear to be elastic solids, having much the consistency of a gelatin gel when at rest, they can however be easily pumped under low pump pressures. Thus, they can be considered to be hybrid fuels.

Furthermore, the present invention suspends solid particles by an entirely different mechanism. In the composition of this invention the solid particles may be said to be encapsulated in the individual globules of internal liquid phase. Thus, in order to settle they would have to pass through a multiplicity of interfaces which they cannot do without breaking the emulsion. Therefore, as long as the emulsion is stable the solids remain suspended.

The hybrid fuels of this invention are high internal phase-low external phase emulsions. They may be either oil-in-water and water-in-oil type emulsions but preferably oil-in-water. The internal phase of the emulsion may be at least 80% by volume, for example at least 85%, preferably at least 90%, but can be at least 95% by volume or greater, the residue of the emulsion comprising the external phase and the emulsifier.

A minor but sufficient amount of emulsifier is added to form the emulsion, for example from 0.05-5% by volume such as from 0.1-4%, but preferably from 0.2-3% of emulsifier, based on the volume of total emulsion.

The emulsion has two phases, one of which is the non-aqueous or oily phase and the other the aqueous or non-oily phase. Each phase must be combustible and/or volatile when employed as a jet or rocket fuel. In general, the oily phase may be any fuel suitable in a jet or rocket fuel such as for example a hydrocarbon fuel generally of petroleum origin.

The term "oily phase," as herein employed, is intended to include a vast number of substances, both natural and artificial, possessing widely different physical properties and chemical structures. All of the substances included within this term are practically insoluble in water, possess a characteristic greasy touch and have a low surface tension. These include the animal oils of both land and sea animals; vegetable oils, both drying and non-drying; petroleum or mineral oils of various classes, including those of open chain hydrocarbons, cyclic hydrocarbons or cycloparaffins, with or without the presence of solid paraffins and asphalts and various complex compounds, and which may or may not contain sulphur or nitrogenous bodies; resin oils and wood distillates including the distillates of turpentine, rosin spirits, pine oil, and acetone oil; various oils, obtained from petroleum products, such as gasolenes, naphthas, gas fuel, lubricating and heavier oils; coal distillate, including benzene, toluene, xylene, solvent naphtha, creosote oil and anthracene oil and ethereal oils.

Furthermore, the presence of the usual amounts of anti-knock compounds or other conventional fuel additives in the oil does not adversely affect the usefulness of the oil for our purposes.

The choice of oily phase materials is not limited to hydrocarbons since esters such as dibutyl phthalate, diethylmaleate, tricresylphosphate, acrylate or methacrylate esters, natural esters, and the like have been employed by us successfully in the preparation of useful emulsions. Tung oil, oiticica oil, castor oil, linseed oil, poppyseed oil, soyabean oil, animal and vegetable oils such as cottonseed oil, corn oil, fish oils, walnut oils, pineseed oils, olive oil, coconut oil, degras, and the like, may also be used.

Practically, the choice of a liquid hydrocarbon for use in a rocket or jet engine is based largely on availability and cost, and on this basis a petroleum hydrocarbon in the gasoline-kerosene range is the preferred material. Generally either liquid oxygen or fuming nitric acid is used with it as the oxidizer. Whenever the latter is used, practically all of the nitrogen in the acid, under proper burning conditions, appears in the combustion products as nitrogen gas. Aliphatic hydrocarbons from petroleum (gasoline, kerosene) are the cheapest and most abundant liquid fuels for rockets. The simpler aromatic hydrocarbons (benzene, toluene) are also abundant, have higher densities, and in general give more thermal energy per pound on combustion so that they produce somewhat more thrust per pound of fuel. Aliphatic hydrocarbons, from the standpoint of structure and heat of combustion, could be expected not to differ appreciably one from another in the energy they could contribute to a jet motor. Unsaturated hydrocarbons which are endothermic (that is, which have negative heats of formation) will, of course, liberate this heat during combustion and contribute to higher exhaust velocities. The highest calculated value of specific impulse for a hydrocarbon burned with oxygen is for diacetylene, $HC \equiv CC \equiv CH$, which gives 271 pound-seconds per pound. This is the highest that can be expected from any carbonaceous fuel burned with liquid oxygen at 300 p.s.i.a. A more usual value (that for normal octane) is about 240 pound-seconds per pound.

The aqueous phase is generally water or another substance suitable for the fuel which is immiscible in the oily phase, for example water, an alkyleneetherglycol such as diethylene glycol, etc.

The emulsions of the present invention possess the following advantages:

(1) *Nonadhesive.*—They tend not to stick to the sides of the container. Thus "hold up" in fuel tanks is minimized.

(2) *Viscosity.*—The apparent rest viscosity is greater than 1000 cps., generally in the range of 10,000–100,000 or greater. However, under low shear, they will flow with a viscosity approaching that of the liquid phases. On removal of shear, the recovery to original apparent rest viscosity is nearly instantaneous. The hysteresis loop is very small.

(3) *Temperature stability.*—Increased temperature has little effect on viscosity until the critical stability temperature is reached at which the points emulsions breaks into its liquid components. This permits a wide temperature range of operation.

(4) *Shear stability.*—Emulsions may be subjected repeatedly to shear without degradation so long as the critical shear point is not reached. At this point the emulsion breaks. However, the critical shear point is sufficiently high to permit pumping at high rates.

(5) *Quality control.*—With these emulsions it is easy to reproduce batches with identical properties due to the absence of any "gel" structure.

(6) *Metering, heat transfer, and nozzle spray characteristics.*—Since emulsions can be broken with high shear, this can be done at the turbopump, giving completely liquid flow from that point on. This will permit metering by conventional means and will preclude laminar flow with attendant reduction of heat transfer capability, resulting in completely liquid nozzle flow and combustion characteristics.

(7) *Solid loading.*—Emulsions will flow well even with high solids loading since they have a broad range between rest viscosity and viscosity under modest shear.

In contrast to very high volume percent solid loading in gels or slurries which result in a "putty," these emulsions can suspend such solids in the internal phase while allowing the external phase to govern "flowability."

(8) *Recovery of oily phase.*—When gelling agents are dissolved in the fuel, distillation is required to recover the original component. With emulsions, application of high shear or high temperature to break the emulsion, and a subsequently decantation or drawoff operation, is all that is required. This is significant in considering a storable weapon system. It would be a simple matter to exhaust a missile, break the fuel emulsion, and remake it periodically as required.

Any suitable emulsifier can be employed. The emulsifiers most usually employed in the practice of this invention are generaly known as oxyalkylated surfactants or more specifically polyalkylene ether or polyoxyalkylene surfactants. Oxyalkylated surfactants as a class are well known. The possible sub-classes and specific species are legion. The methods employed for the preparation of such oxyalkylated surfactants are also too well known to require much elaboration. Most of these surfactants contain, in at least one place in the molecule and often in several places, an alkanol or a polyglycolether chain. These are most commonly derived by reacting a starting molecule, possessing one or more oxyalkylatable reactive groups, with an alkylene oxide such as ethylene oxide, propylene oxide, butylene oxide, or higher oxides, epichlorohydrin, etc. However, they may be obtained by other methods such as shown in U.S. Patents 2,588,771 and 2,596,091–3, or by esterification or amidification with an oxyalkylated material, etc. Mixtures of oxides may be used as well as successive additions of the same or different oxides may be employed. Any oxyalkylatable material may be employed. As typical starting materials may be mentioned alkyl phenols, phenolic resins, alcohols, glycols, amines, organic acids, carbohydrates, mercaptans, and partial esters of polybasic acids. In general, the art teaches that, if the starting material is water-soluble, it may be converted into an oil-soluble surfactant by the addition of polypropoxy or polybutoxy chains. If the starting material is oil-soluble, it may be converted into a water-soluble surfactant by the addition of polyethoxy chains. Subsequent additions of ethoxy units to the chains tend to increase the water solubility, while, subsequent additions of high alkoxy chains tend to increase the oil solubility. In general, the final solubility and surfactant properties are a result of a balance between the oil-soluble and water-soluble portions of the molecule.

In the practice of this invention it has been found that emulsifiers suitable for the preparation of high internal phase ratio emulsions may be prepared from a wide variety of starting materials. For instance, if one begins with an oil-soluble material such as a phenol or a long chain fatty alcohol and prepare a series of products by reaction with successive portions of ethylene oxide, one finds that the members of the series are successively more water-soluble. One finds also that somewhere in the series there will be a limited range where the products are useful for the practice of this invention. Similarly it is possible to start with water or a water-soluble material such as polyethylene glycol and add, successively, portions of propylene oxide. The members of this series will be progressively less water-soluble and more oil-soluble. Again there will be a limited range where the materials are useful for the practice of this invention.

In general, the compounds which would be selected for testing as to their suitability are oxyalkylated surfactants of the general formula $$Z[(OR)_nOH]_m$$

wherein Z is the oxyalkylatable material, R is the radical derived from the alkylene oxide which can be, for example, ethylene, propylene, butylene, epichlorohydrin and the like, $n$ is a number determined by the moles of alkylene oxide reacted, for example 1 to 2000 or more and $m$ is a whole number determined by the number of reactive oxyalkylatable groups. Where only one group is oxyalkylatable as in the case of a monofunctional phenol or alcohol R'OH, then $m=1$. Where Z is water, or a glycol, $m=2$. Where Z is glycerol, $m=3$, etc.

In certain cases, it is advantageous to react alkylene oxides with the oxyalkylatable material in a random fashion so as to form a random copolymer on the oxyalkylene chain, i.e. the $[(OR)_nOH]_m$ chain such as

—AABAAABBABABBABBA—

In addition, the alkylene oxides can be reacted in an alternate fashion to form block copolymers on the chain, for example —BBBAAABBBAAAABBBB— or

—BBBBAAACCCAAAABBBB— where A is the unit derived from one alkylene oxide, for example ethylene oxide, and B is the unit derived from a second alkylene oxide, for example propylene oxide, and C is the unit derived from a third alkylene oxide, for example, butylene oxide, etc. Thus, these compounds include terpolymers or higher copolymers polymerized randomly or in a block-wise fashion or many variations of sequential additions.

Thus, $(OR)_n$ in the above formula can be written $—A_aB_bC_c—$ or any variation thereof, wherein $a$, $b$, and $c$ are 0 or a number provided that at least one of them is greater than 0.

It cannot be overemphasized that the nature of the oxyalkylatable starting material used in the preparation of the emulsifier is not critical. Any species of such material can be employed. By proper additions of alkylene oxides, this starting material can be rendered suitable as an emulsifier and its suitability can be evaluated by plotting the oxyalkyl content of said surfactant versus its performance, based on the ratio of the oil to water which can be satisfactorily incorporated into water as a stable emulsion. By means of such a testing system any oxyalkylated material can be evaluated and its proper oxyalkylation content determined.

As is quite evident, new oxyalkylated materials will be constantly developed which could be useful in our compositions. It is therefore not only impossible to attempt a comprehensive catalogue of such compositions, but to attempt to describe the invention in its broader aspects in terms of specific chemical names of its components used would be too voluminous and unnecessary since one skilled in the art could by following the testing procedures described herein select the proper agent. This invention lies in the use of suitable oxyalkylated emulsifiers in preparing the compositions of this invention and their individual composition is important only in the sense that their properties can effect these emulsions. To precisely define each specific oxyalkylated surfactant useful as an emulsifier in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduct with confidence the applicability of oxyalkylated emulsifiers suitable for this invention by means of the evaluation tests set forth herein. In analogy to the case of a machine wherein the use of certain materials of construction or dimensions of parts would lead to no practical useful result, various materials will be rejected as inapplicable where others would be operative. One can obviously assume that no one will wish to make a useless composition or will be misled because it is possible to misapply the teachings of the present disclosure in order to do so. Thus, any oxyalkylated surfactant that can perform the function stated herein can be employed.

REPRESENTATIVE EXAMPLES OF Z

| No. | Z |
|---|---|
| 1 | $RC(=O)—O—$ 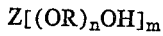 |
| 2 | $R_n$—⬡—O—  |
| 3 | R—O— |
| 4 | R—S— |
| 5 | $R—C(=O)—N(H)—$ |
| 6 | $R—C(=O)—N\langle$ |
| 7 | $R—N(H)—$ |
| 8 | $RN\langle$ |
| 9 | Phenol-aldehyde resins. |
| 10 | —O— (Ex.: Alkylene oxide block polymers.) |
| 11 | —O—⬡(R)—X—⬡(R)—O—  X= —O—, —S—, —CH$_2$—S(=O)$_2$—, etc.  |
| 12 | $R—S—CH_2C(=O)—O—$ |
| 13 | $RPO_4H—$ |
| 14 | $RPO_4\langle$ |
| 15 | $PO\equiv$ |
| 16 | $R_n$—⬡—SO$_2$N(H)— |
| 17 | $R_n$—⬡—SO$_2$N= |
| 18 | $RC(=O)—N(H)—$⬡—N$\langle$ |
| 19 | Polyol-derived. (Ex.: Glycerol, glucose, pentaerythritol.) |
| 20 | Anhydrohexitan or anhydrohexide derived. (Spans and Tweens.) |
| 21 | Polycarboxylic derived. |
| 22 | —CHCH$_2$—O$_n$<br>\|<br>CH$_2$<br>\|<br>amine |

Examples of oxyalkylatable materials derived from the above radicals are legion and these, as well as other oxyalkylatable materials, are known to the art. A good source of such oxyalkylatable materials, as well as others, can be found in "Surface Active Agents and Detergents," vol. 1 and 2, by Schwartz, et al., Interscience Publishers (vol. 1, 1949–vol. 2, 1958) and the patents and references referred to therein.

In general, the base oxyalkylatable material is tested for solubility in water or toluene, or any other suitable oily material. If it is water soluble it is oxyalkylated with propylene or butylene oxide until it is just oil soluble, with representative samples being collected as its oxyalkylate content is increased. If the oxyalkylatable material is oil-soluble, then it is oxyalkylated with ethylene oxide until it is just water-soluble, with representative samples being collected as its oxypropylation or oxybutylation content is increased. These samples are similarly tested. This procedure can thereupon be repeated with another alkylene oxide until opposite solubility is achieved, i.e. if the material is water-soluble it is oxypropylated or oxybutylated until it is oil-soluble. If the prior oxypropylated or oxybutylated material is oil-soluble, it is treated with ethylene oxide until it is water-soluble. This can be repeated in stages each time changing the material to one of opposite solubility by using a hydrophile oxide (i.e. EtO) for an oil-soluble material and a hydrophobe oxide (i.e. PrO or BuO) for water solubility. The same procedure and tests are employed at each stage, proceeding each time to oxylation to opposite solubility.

Although the amount of oxyalkylated material present in the emulsion has been stated to be 0.05–5 volume percent, but preferably 0.2–3%, larger amounts can also be employed if desired. However, economics generally restrict the amount employed to the ranges indicated.

The exact range which is useful for the practice of this invention will vary with the starting emulsifier base and the sequence of alkylene oxides used to achieve the polyalkylene ether chains. It should also be noted that materials useful in the practice of this invention can be made by other well-known methods besides oxyalkylation such as the esterification of a polyalkylene ether alcohol, reaction of carboxylic acids with oxyalkylated amines, etc. Thus, the term "oxyalkylated" includes any means of attaching the oxyalkyl group to a molecule. Any method of attaching oxyalkyl groups to a molecule can be employed.

It has also been found that the optimum range of effectiveness for any particular emulsifier series will vary with the particular oil phase and also with the composition of the aqueous phase which is employed.

To illustrate the variety of materials that may be used as emulsifiers in the practice of this invention the following examples are presented. It should be noted that these examples are simply illustrative and should not be construed as imposing limitations on the scope of the invention.

*Example 1*

The same general procedure was employed as described in U.S. Patent 2,572,886, Example 1a, columns 9 and 10, except that the starting material was n-decanol. Propylene oxide was added first in a weight ratio of 1.96 parts of oxide to one part of n-decanol, and ethylene oxide was then added in a ratio of 2.61 parts of oxide to one part of n-decanol. The final product was a viscous amber liquid.

Examples 2 through 8 were prepared in the same manner as Example 1 except that the relative amounts of n-decanol, propyleneoxide, and ethylene oxide added in the order given were as listed in Table I.

TABLE I

| Example No. | Weight n-decanol | Weight Propylene Oxide | Weight Ethylene Oxide |
|---|---|---|---|
| 2 | 1 | 3.67 | 0.00 |
| 3 | 1 | 3.67 | 0.65 |
| 4 | 1 | 3.67 | 1.59 |
| 5 | 1 | 3.67 | 2.24 |
| 6 | 1 | 3.67 | 2.78 |
| 7 | 1 | 3.67 | 3.38 |
| 8 | 1 | None | 2.72 |

In Table II a series of examples are given in which a crude alkyl ($C_3$–$C_{20}$) phenol was treated with ethylene oxide in the method of Example 1.

TABLE II

One part by weight of crude phenol foots was reacted with the parts shown in the table of ethylene oxide.

Example No.:                   Ethylene oxide
9 ---- 0.97
10 ---- 1.0
11 ---- 1.1
12 ---- 1.2
13 ---- 1.27
14 ---- 1.31
15 ---- 1.37
16 ---- 1.47
17 ---- 1.56
18 ---- 1.75
19 ---- 1.97
20 ---- 2.2
21 ---- 2.28

Examples 22 through 33 were made by the same general method described in Example 1 except that the starting material was glycerine. The proportions of reactants are listed in Table III. The alkylene oxides were added in the order given reading from left to right.

TABLE III

| Ex. No. | One part by weight glycerine to— | | |
|---|---|---|---|
| | Parts Butylene Oxide | Parts Propylene Oxide | Parts Ethylene Oxide |
| 22 | 2.52 | 34.1 | 5.32 |
| 23 | 2.52 | 34.1 | 10.0 |
| 24 | 2.52 | 34.1 | 21.0 |
| 25 | 2.52 | 34.1 | 25.0 |
| 26 | 2.52 | 28.5 | 5.6 |
| 27 | 2.52 | 28.5 | 9.3 |
| 28 | 2.52 | 28.5 | 13.4 |
| 29 | 2.52 | 28.5 | 18.5 |
| 30 | 9.2 | 24.0 | 5.62 |
| 31 | 9.2 | 24.0 | 12.5 |
| 32 | 9.2 | 24.0 | 20.0 |
| 33 | 9.2 | 24.0 | 24.0 |

Example 34—A mixed nonyl-butyl phenol-acid catalyzed-formaldehyde resin was prepared by the method of U.S. Patent 2,499,370, Example 1a.

Examples 35 through 48 were prepared by stepwise oxyalkylation of the resin produced in Example 34 by the procedure described in U.S. Patent 2,499,370, Example 1b, except that the proportions of oxides used were as listed in Table IV. The oxides used were as listed in Table IV. The oxides were added in the order given reading from left to right.

TABLE IV

| Ex. No. | Moles of Propylene Oxide per phenolic unit of starting resin | Moles of Ethylene Oxide per phenolic unit of starting resin |
| --- | --- | --- |
| 35 | 1,012 | 150.8 |
| 36 | 1,012 | 246.1 |
| 37 | 1,012 | 336.5 |
| 38 | 1,012 | 449.0 |
| 39 | 1,012 | 581.0 |
| 40 | 1,012 | 893.7 |
| 41 | 1,012 | 1,343.0 |
| 42 | 848 | 129.1 |
| 43 | 848 | 199.3 |
| 44 | 848 | 285.0 |
| 45 | 848 | 376.1 |
| 46 | 848 | 487.5 |
| 47 | 848 | 756.0 |
| 48 | 848 | 1,147.8 |

*Examples 49, 50, 51*

Polyepichlorohydrin-amine compounds were prepared by the methods described in application 820,116, filed June 15, 1959, and assigned to Petrolite Corporation, De Groote and Cheng.

Example 49 is Example 18b of said application.
Example 50 is Example 19b of said application.
Example 51 is Example 17b of said application.

*Example 52*

The product of Example 49 was treated as in Example 1 except that the starting material was treated with 2.16 parts of propylene oxide, 3.31 parts of ethylene oxide and finally with 19.6 parts of propylene oxide in the order given.

*Example 53*

The product of Example 50 was treated as in Example 1 except that 2.24 parts of propylene oxide, 2.85 parts of ethylene oxide, and 24.3 parts of propylene oxide were used in the order given.

*Example 54*

The product of Example 51 was treated as in Example 53 except that 2.23 parts of propylene oxide, 2.93 parts of ethylene oxide, and 25.5 parts of propylene oxide were used in the order given.

Table V shows the final composition of materials produced by the treatment of the product of Examples 52, 53 and 54 with successive amounts of ethylene oxide.

TABLE V

| Example No. | Starting Material Product of— | Percent Additional Ethylene Oxide Based on Starting Material |
| --- | --- | --- |
| 55 | Ex. 52 | 10 |
| 56 | Ex. 52 | 20.4 |
| 57 | Ex. 52 | 30 |
| 58 | Ex. 52 | 39.1 |
| 59 | Ex. 53 | 10 |
| 60 | Ex. 53 | 20 |
| 61 | Ex. 53 | 30 |
| 62 | Ex. 53 | 40 |
| 63 | Ex. 54 | 20 |
| 64 | Ex. 54 | 30 |
| 65 | Ex. 54 | 40 |

*Example 66*

The procedure of Example 1 was employed except that 1.3-butanediol was the starting material and 3.0 parts of butylene oxide, 32.2 parts of propylene oxide, and 16.6 parts of ethylene oxide were employed in the order given.

*Example 67*

The general procedure of Example 1 was employed except that the starting material was triethylene glycol and that 5.1 parts of butylene oxide, 30.0 parts of propylene oxide, and 22 parts of ethylene oxide were used in the order given.

*Example 68*

The same general procedure as Example 1 was employed except that the starting material was tetraethylene glycol and that 5.1 parts of butylene oxide, 30.0 parts of propylene oxide, and 14.0 parts of ethylene oxide were used in the order given.

*Example 69*

One part of dipropylene glycol was treated with 29.8 parts of propylene oxide and 20.5 parts of ethylene oxide in this order according to the general procedure of Example 1.

*Example 70*

One part by weight of castor oil was treated with 6.8 parts of propylene oxide according to the procedures mentioned above.

*Example 71*

One part by weight of crude tall oil was treated with 3.27 parts of ethylene oxide according to the procedures mentioned above.

*Example 72*

One mole of stearyl alcohol was treated with 3.12 moles of ethylene oxide and then the resulting material was reacted with 1.5 moles sulfamic acid to convert the terminal hydroxide to a sulfate group.

*Example 73*

181 grams of a mixture of $C_{10}$ to $C_{12}$ fatty acids were heated in a reaction flask with 61 grams of monoethanolamine. The result was a viscous brown material which consisted for the most part of amides of the mixed acids.

One of the new and novel aspects of the present invention is the ease with which the emulsions can be prepared. While a few instances of emulsions of over 70 to 75% internal phase have been known to the art, they are difficult to prepare and tend to be unstable. Most of them are laboratory curiosities and not well adapted to large-scale, commercial production.

Present practice for the commercial production of emulsions of even moderately high internal phase ratio calls for the use of a colloid mill or other method of extremely high shear. Paint mills, high speed cone mills, and roller mills are employed. These methods require the use of expensive equipment and the utilization of large amounts of power. Even with these methods, the internal phase ratio seldom exceeds 70% internal phase.

On the contrary, in the practice of this invention only the simplest equipment is required. Actually useful and novel emulsions with internal phase ratios of over 80% and even over 90% and 95% to 99%, can be made by simple hand stirring with a paddle or spoon. In actual practice a wide variety of mixing devices may be used. The following examples will illustrate the great advantages to be gained by the practice of this invention. The examples should not be construed as limitations on the methods which may be employed.

*Example 74*

Ten ml. of water and 2 ml. of the material of Example 1 were mixed by shaking in a quart jar. Ten ml. of isooctane was added and the mixture shaken until all the isooctane had emulsified. Additional amounts of isooctane were added, with shaking, until a total of 800 ml. of isooctane had been added. The result was a stiff, almost translucent jelly. This material was found to be stable over the range 10° C. to 50° C. for several weeks. It is an oil-in-water emulsion as shown by the fact that it can be diluted with water to form a thin, white dispersion of isooctane in water.

Example 75

Three quarts of water and 150 ml. of the material of Example 66 were thoroughly mixed. One gallon of kerosene was then added and mixed into this material until a smooth emulsion was formed. This premix was then placed into a 20 gallon open mixing vessel, equipped with an anchor type stirrer. With the stirrer revolving at about 200 r.p.m., additional kerosene was added until a total of ten gallons of kerosene had been mixed in. The result was a white, highly thixotropic, oil-in-water emulsion. Samples of this material were stable after being stored in closed containers for ten months at normal room temperature.

Example 76

A two inch diameter, Viking pump, driven by an electric motor at 850 r.p.m., was equipped with an eight foot flexible hose on the outlet and a similar flexible hose on the inlet. The ends of the two hoses were placed in a 50 gallon, open head, steel drum. With this arrangement, material could be pumped out of the drum, through the pump, and back into the drum.

One gallon of water and one pint of the material of Example 67 were mixed together and placed in the steel drum. While this material was circulated by the pump, mineral spirits was slowly added to the intake of the pump. In about 15 minutes, 50 gallons of mineral spirits had been added and the result was a thick, white, jelly-like emulsion.

For the preparation of small laboratory batches of emulsions it is preferred to use a kitchen-type mixer, such as the model C-3, Kitchen Aid Mixer manufactured by the Hobart Manufacturing Company. This mixer uses a two quart glass mixing bowl and a wire beater with a planetary motion. The testing procedure is as follows:

Example 77

Ten ml. of the aqueous phase is mixed with a suitable amount, usually 2 ml. to 4 ml., of the emulsifier in a glass mixer bowl. With the mixer running at a speed setting of 2 to 6, the organic phase is slowly added to the bowl. Initial additions should be made in small amounts, allowing the mixer ample time to incorporate the oil into the emulsion. As the amount of material in the bowl increases, the mixing action is more efficient and further additions may be made more rapidly. When the mixer will no longer produce an emulsion with no free oil phase, the limit of the test is considered to have been reached.

In general, it has been found that emulsifiers which have heretofore been used for the production of conventional oil-in-water emulsions will not permit the incorporation of more than 20 to 30 ml. of oil phase before breaking or inversion occurs. On the contrary, the materials of this invention allow the incorporation of over 100 ml. of oil phase into a stable emulsion and it is quite common to incorporate 500 ml. or more of oil phase. In fact, a material suitable is not usually considered for practical use if it does not permit the incorporation of at least 450 ml. of the oil phase per 10 ml. of non-aqueous phase.

As stated above, a wide variety of materials may be used as emulsifiers in the practice of this invention. However, not all materials of a particular type are suitable for the production of a specific emulsion. As previously stated, the effectiveness of a particular material varies with the composition of both the oil and aqueous phase. One finds that the test outlined in Example 77 a simple and convenient method of establishing the optimum material for a particular system. Table VI shows the amounts of oil phase which may be successfully incorporated into 13 ml. of the aqueous emulsifier mixture by the procedure of Example 77.

TABLE VI

| Emulsifier of Example No. | Ml. of Kerosene in 10 ml. of aqueous phase plus 3 ml. of emulsifier | Percent oil as internal phase of emulsion |
| --- | --- | --- |
| 9 | None | None |
| 10 | None | None |
| 11 | None | None |
| 12 | None | None |
| 13 | 10 | 43.5 |
| 14 | 10 | 43.5 |
| 15 | 20 | 60.6 |
| 16 | 275 | 95.5 |
| 17 | 275 | 95.5 |
| 18 | 500 | 97.5 |
| 19 | 15 | 53.6 |
| 21 | 10 | 43.5 |

It will be noted that the emulsifiers listed in Table VI represent members of a family of related materials produced by the reaction of successively greater amounts of ethylene oxide with a phenol. The composition of all possible members of this family may be represented in a one-dimensional, i.e. straight line, diagram. The base line of FIGURE 1 represents such a one-dimensional composition space. In FIGURE 1, the data of Table VI has been plotted in a conventional manner upon the base line. It will be noted that the effectiveness of the materials in this particular system definitely passes through a maximum as one travels along the base line in the direction of increased ethylene oxide content.

Figure 2:
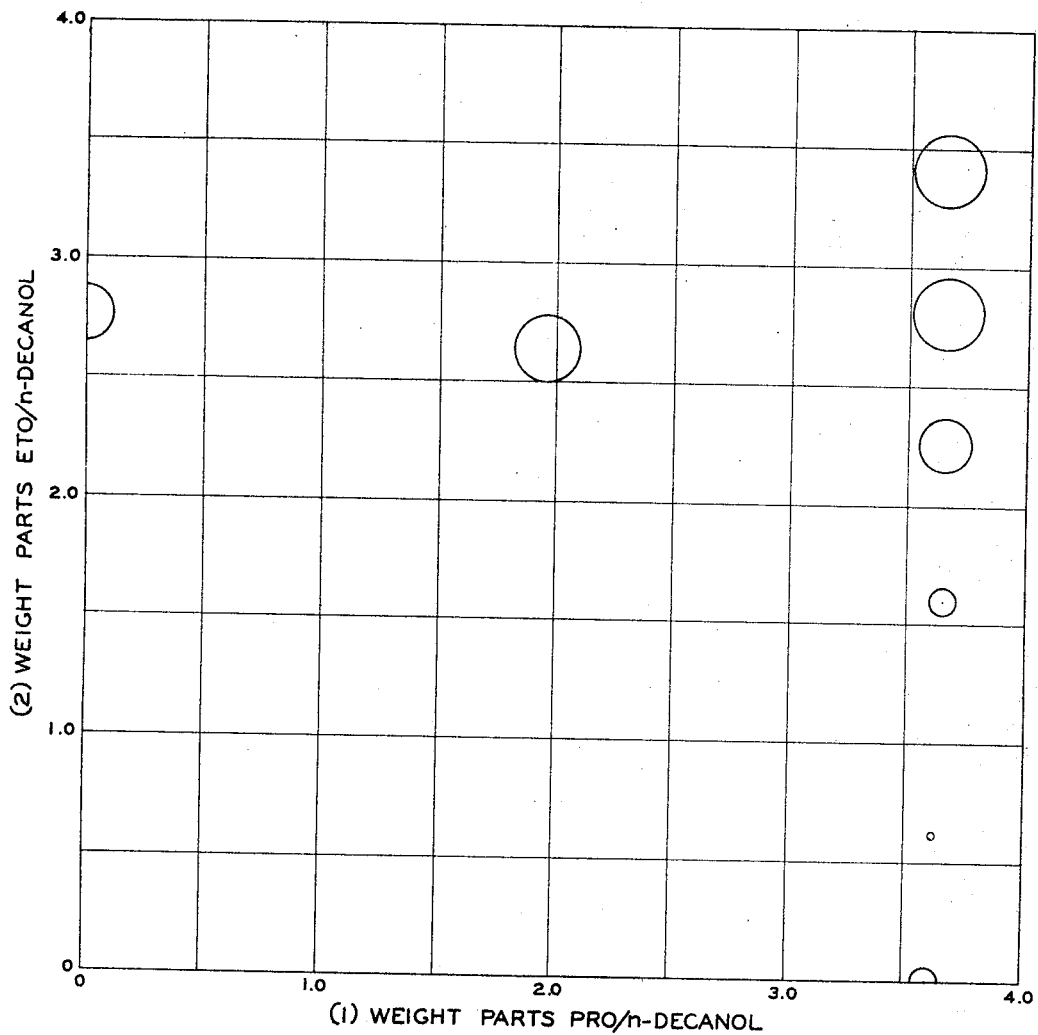

In a similar manner it will be noted that the materials of Examples 1 through 8 are members of a general family prepared by the stepwise addition of first propylene oxide and then ethylene oxide to n-decanol. All possible members of this family may be plotted in a two-dimensional composition space where the origin represents the parent alcohol, one dimension represents successively larger amounts of propylene oxide, and the other dimension represents successively larger amounts of ethylene oxide, added to the base alcohol, in this case n-decanol. (1) in the diagram represents first addition, (2) second addition. FIGURE 2 illustrates this method of plotting the compositions of Examples 1 through 8. It should be carefully noted that this composition space is non-commutative. That is, it makes a real difference if the ethylene oxide is added before the propylene oxide. FIGURE 2, as represented, is valid only if all the propylene oxide is added before the ethylene oxide is added. Stated another way—oxyalkylatable base plus ethylene oxide plus propylene oxide does not equal base plus propylene oxide plus ethylene oxide. That is, of course, implicit in the statement that the composition space is non-commutative.

Table VII records the amounts of hydrocarbon that may be successfully incorporated into a stable oil-in-water emulsion according to the method of Example 77.

TABLE VII

| Emulsifier of example No.: | Ml.[1] |
| --- | --- |
| 1 | 620 |
| 2 | 270 |
| 3 | None |
| 4 | 230 |
| 5 | 480 |
| 6 | 650 |
| 7 | 600 |
| 8 | 500 |

[1] Milliliters of hydrocarbon emulsified in 10 ml. of water by 3 ml. of emulsifier.

In FIGURE 2 the data of Table VII is plotted on the non-commutative composition space discussed previously by letting the size of the circles represent the milliliters of internal phase that can be incorporated into a stable emulsion and the location of the centers of the circles represent the composition of the emulsifier. Obviously, for a complete delineation of the maximal performance area considerably more points would have to be obtained. Even with these few points, however, it is possible to begin to see the location of areas of superior performance. It is also obvious that this technique of assembling the data on the model of a composition space brings related materials into conjunction and makes it possible to analyze the data for the selection of compounds with maximum effectiveness.

It is interesting to note that, while the material of Example 2 has some effectiveness as an emulsifier, the effect of the addition of a small amount of ethylene oxide to this compound to form Example 3 is to destroy the effectiveness. Further additions of ethylene oxide to produce the materials of Examples 4 through 7 unexpectedly result in the production of materials with progressively increased effectiveness, reaching a maximum in Example 6. It would obviously be impossible to predict such behavior from the present teaching of the art.

In general, in the practice of this invention, the preferred method for selection of materials of optimum effectiveness is to prepare a family of related materials and test them for effectiveness in the particular aqueous-oil system that is under consideration. A water-soluble base is oxyalkylated with propylene oxide (PrO) or butylene oxide (BuO) until it just becomes oil-soluble and selected members of the series are tested. An oil-soluble base is treated with ethylene oxide (EtO) and similarly tested. A test such as that outlined in Example 77 may be used or any other test that accurately reflects the proposed methods of preparation of the desired emulsion. The results of the tests are then plotted on a multi-dimensional non-commutative composition space that represents the family of materials being used. Such tests and plots reveal the existence of an optimum-performance region in the composition space.

A full discussion of devices of this type can be found in U.S. Patent 3,083,232.

Figure 3:
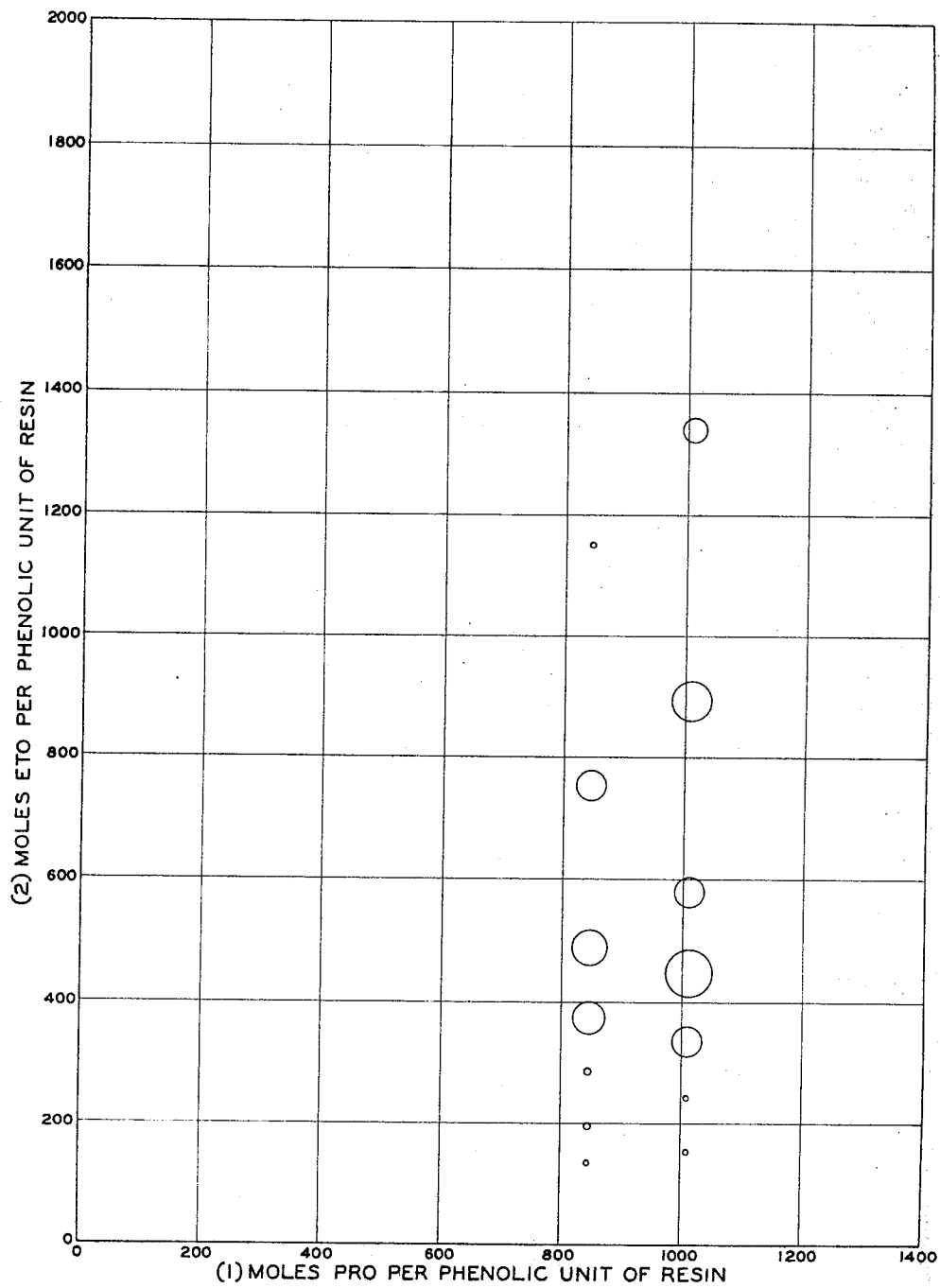

Table VIII shows the results of a series of tests such as those of Example 77 which were run on the materials of Examples 35 through 48. FIGURE 3 shows the results of Table VIII plotted on a composition-space diagram.

TABLE VIII

| Emulsifier of example No.: | Ml.[1] |
|---|---|
| 35 | None |
| 36 | None |
| 37 | 295 |
| 38 | 420 |
| 39 | 280 |
| 40 | 400 |
| 41 | 250 |
| 42 | 10 |
| 43 | 20 |
| 44 | 20 |
| 45 | 334 |
| 46 | 350 |
| 47 | 310 |
| 48 | 15 |

[1] Milliliters of oil phase incorporated into stable emulsion in 10 ml. of water and 3 ml. of emulsifier by stirring in mixer bowl at speed No. 2.

Here again, as in FIGURE 2, the great advantage of the composition-space plot is apparent.

Table IX records the results of a series of tests for optimum efficiency which were run on the family of materials represented by Examples 20 through 33. These materials were prepared by three separate stepwise additions of different alkylene oxides. Specifically they were prepared by reacting glycerine with, first, butylene oxide; second, propylene oxide; and lastly with ethylene oxide. This family of materials may be represented in a three dimensional, non-commutative, composition space. This is an obvious extension of the method of the previous one-dimensional and two-dimensional examples. A sketch of such a three-dimensional, composition space is shown in FIGURE 4. The three straight lines passing vertically through the composition space represent sub-families of the general class, the members of which differ only in the amount of final ethylene oxide which was added. FIGURES 4, 5, 6, and 7 show the relative effectiveness of these sub-families as recorded in Table IX. Again inspection of the three line graphs and their inter-relation as represented in FIGURE 4, make it possible to define regions of maximum efficiency in the three-dimensional composition spaced. This can act as a valuable guide in the further exploration of the regions and in the selection of the best material for commercial exploitation.

TABLE IX

| Emulsifier Example No.: | Ml.[1] |
|---|---|
| 22 | None |
| 23 | 450 |
| 24 | 495 |
| 25 | 450 |
| 26 | 20 |
| 27 | 20 |
| 28 | 10 |
| 29 | 10 |
| 30 | None |
| 31 | 325 |
| 32 | 400 |
| 33 | 330 |

[1] Milliliters of oil phase attained in emulsification test.

A similar series of test results is recorded in Table X for the materials of Examples 49 through 65. These materials are members of a rather complex family of materials. The synthesis may be considered to have five distinct steps.

TABLE X

| Emulsifier of Example No. | Ml. emulsified | Relative effectiveness |
|---|---|---|
| 49 | 200 | Not stable. |
| 50 | 250 | Stable emulsion. |
| 51 | 300 | Do. |
| 52 | 280 | Not stable. |
| 53 | 100 | Stable emulsion. |
| 54 | 110 | Do. |
| 55 | 340 | Not stable. |
| 56 | 290 | Do. |
| 57 | 330 | Do. |
| 58 | 300 | Do. |
| 59 | 30 | Stable emulsion. |
| 60 | 350 | Do. |
| 61 | 220 | Do. |
| 62 | 450 | Do. |
| 63 | 300 | Do. |
| 64 | 250 | Do. |
| 65 | 480 | Do. |

Figure 8:
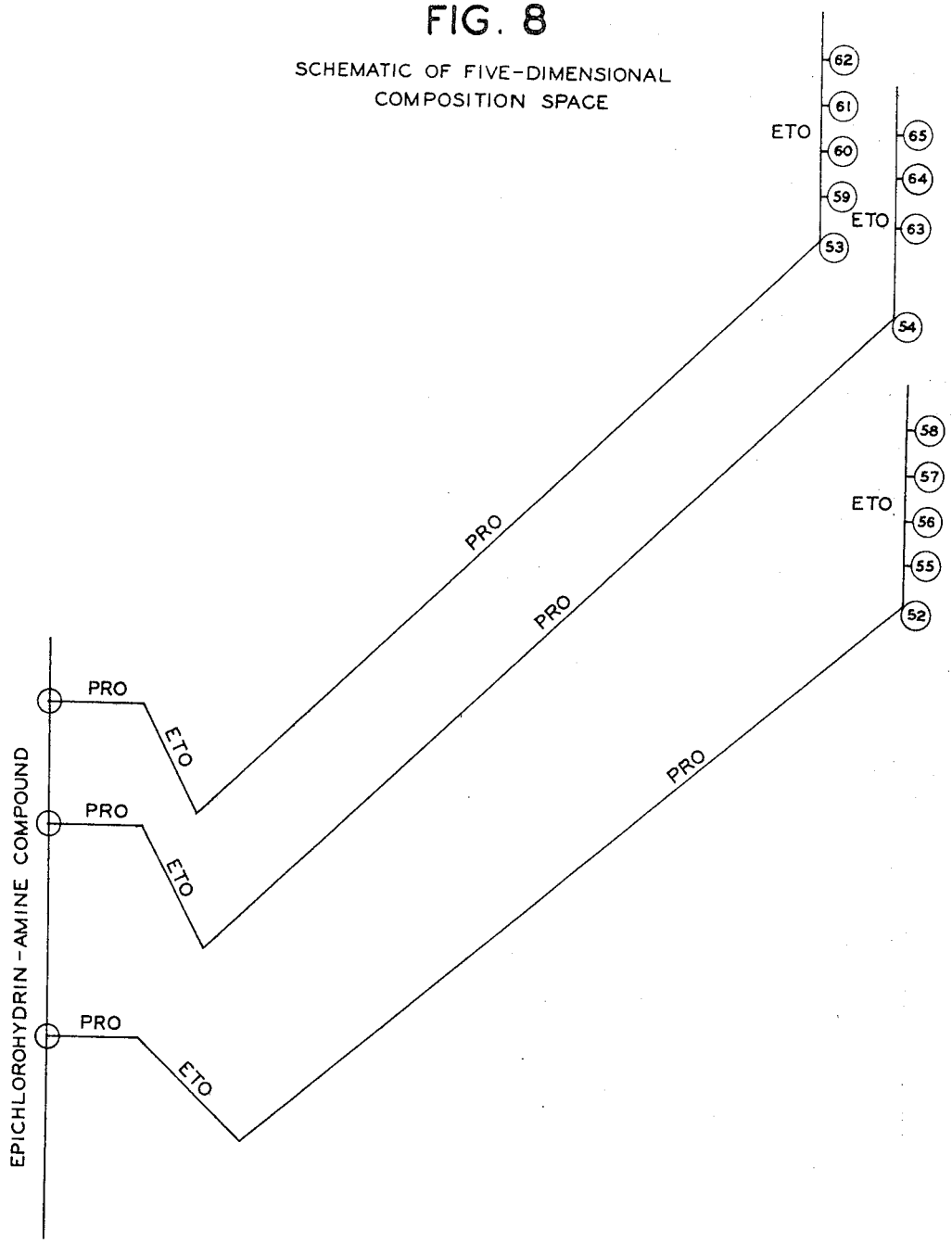
Figure 9:
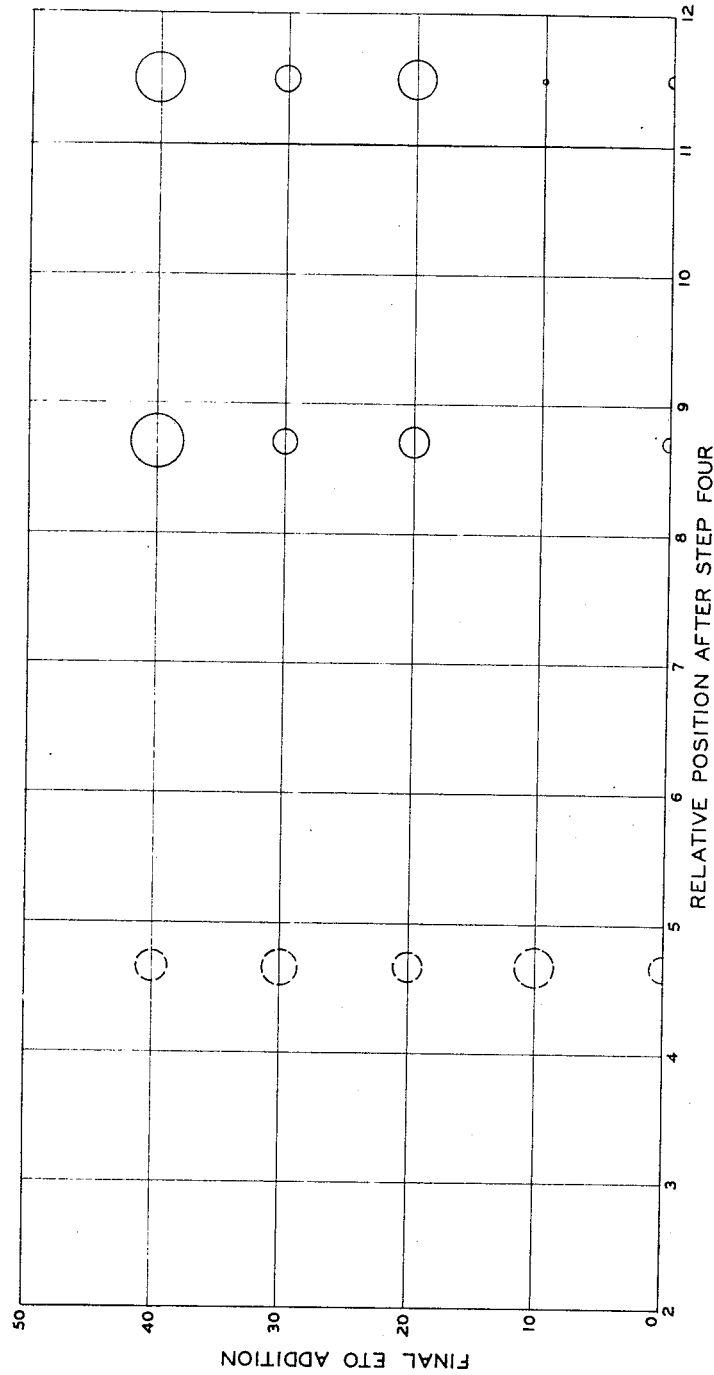

These steps consist of the original polymerization of epichlorohydrin and the condensation with the polyamine, the treatment with propylene oxide, then with ethylene oxide, then again with propylene oxide, and finally again with ethylene oxide. Examples 49, 50, and 51 represent materials taken at the end of step one. Examples 52, 53, and 54 represent materials taken at the end of step four. The rest of the examples of the group represent materials obtained by performance of the final step in the series. By a direct extension of the mapping principles outlined in the previous discussion using standard mathematical techniques, the materials of this series may be regarded as being distributed within a five-dimensional non-commutative composition-space. Mapping of suitable two- and three-dimensional regions of this composition space serve to delineate the maximal regions. The number of two-dimensional and three-dimensional maps required to demark the region fully is, naturally, larger than for the simpler lower-dimensional examples. For brevity, only a schematic plot and a provisional plot of the last two dimensions is given in FIGURES 8 and 9.

It should be noted in passing that if only Examples 52, 55, 56, 57 and 58 of this group had been tested, the family would have been rejected as unsuited for the purposes of the invention. The selection of other regions in the composition-space, however, reveals materials of potential utility.

Other materials of a non-oily nature are also used as jet and rocket fuels. Examples of such fuels are ethyl and methyl alcohols, pyridine, pentaborane, dihydropentaborane, aluminum borohydride, etc. If such non-oily fuels are to be primary liquid fuel for a system, a non-miscible oily phase must be chosen for the minor component, external phase of the emulsion. In general, any non-miscible liquid may be chosen provided that it is non-reactive with the principal fuel, is combustible or volatile, and is compatible with the emulsifier. In general the choice of the external phase is dictated by solubility properties and potential fuel value. These are examples of non-oily type emulsions, i.e., oil external emulsions and aqueous to the water-in-oil type emulsions.

The final viscosity of these compositions is a function of the particular emulsifier used, the ratio of the two phases, and the method employed to produce the intimate mixture. Compositions may be formed which vary in consistency from that of thick cream to jellies which are so stiff that they may be cut into pieces and stand unsupported. Thus, the viscosity may be chosen to suit the particular application. For example, a series of compositions were made as described in Example 77 in which successively larger amounts of hydrocarbon were mixed into the emulsion. With 200 ml. of oil phase the viscosity as measured with a Brookfield viscometer, using a No. 4 spindle at 6 r.p.m., was 58,000 cp. When 300 ml. of oil was used the viscosity was 85,000 cp. and when 600 ml. of oil was used the viscosity was over 100,000 cp. All of these compositions are thixotropic, i.e. the measured viscosity is a function of the rate of shear. For example, the case cited above, using 200 ml., showed a viscosity of 58 cp. at 6 r.p.m. The viscosities at 12 r.p.m., 30 r.p.m., and 60 r.p.m. respectively were 29,500, 13,800, and 8,000. Thus, as the rate of shear increases the effective viscosity decreases. This is of great importance where the material has to be pumped. It means that a material that, when stationary or at low shear, behaves like a thick jelly, will become fluid while being pumped and regain its viscosity as it slows down. This thixotropy is a general property of the composition of this invention.

Illustrations have already been given of the wide variety of materials that may be used as emulsifiers in the practice of this invention. It should be noted that no single specific emulsifier will necessarily be operative on all possible phase combinations. However, by the application of a simple laboratory test such as that outlined in Example 77, anyone skilled in the art can readily ascertain the emulsifier best suited for any particular purpose.

It has been shown that the phase ratio has an effect on the final viscosity of compositions. The particular emulsifier also has an effect. For example, three compositions were made by the general method of Example 77, using 200 ml. of kerosene as the oil phase and the materials of Examples 18, 1, and 67 as emulsifiers. The viscosity of the compositions as measured with a No. 4 spindle at 6 r.p.m. was 58,000, 32,000, and 26,000 respectively. Thus, it can be seen that the control of the final properties of the compositions may be effected by the choice of emulsifier.

The method of making the emulsions will also have a profound effect on the final viscosity of the composition. For example two batches of material were made by the method of Example 77 using kerosene as the internal phase and water as the external phase, with the material of Example 67 as the emulsifier. The only difference in the operation was that one batch was allowed to stir for 5 minutes after all trace of free kerosene had disappeared. The least stirred material had a viscosity of 26,000 cp. The material which had been stirred longer had a viscosity of over 100,000 cp. Thus, it will often be found that by continuing the stirring for a longer period than necessary to form a stable emulsion will often result in a more viscous product. Contrary to general emulsion practice, however, increased shear, will not necessarily make a stiffer composition. In fact, if a method employing extremely high shear is used, an inferior emulsion results. For example, in the method of Example 77 it is often easier to get a satisfactory emulsion by using the low speeds on mixer than it is using high speeds. It is as though the higher shear methods prevent the formation of the necessary structure in the composition and may even cause inversion. As a further example may be mentioned the use of pumps as mixers as outlined in Example 76. It has been found that a moderate speed pump with some slippage such as a Jabsco pump with a flexible rubber impeller or a Viking pump perform well. However, it is found that if the speed of the pump is increased the effectiveness increases to a point and then falls off sharply. In fact, these emulsions may be broken back to their component phases by subjecting them to extremely high shear such as by passing them through a high speed centrifugal pump or forcing them through a small nozzle. It is one of the advantages of this invention that high speed, high power equipment is not necessary for the production of these products. Colloid mills and other high shear devices may be eliminated and simple mixing and blending apparatus or pumps used instead. In field use such emulsions may be made by stirring with a wooden paddle by hand.

In some applications it may be desirable to be able to break the emulsion and reclaim the original phases. In such cases advantage may be taken of the effect of extremely high shear. For instance, thickened fuels of the type encompassed by this invention are easier to transport and less subject to evaporation, ignition, and spillage than fuels in conventional form. Due to their thixotropy they may be pumped without difficulty. They may be broken back to the original fuel by passing through a nozzle and allowing the small amount of aqueous phase to settle out. This is not true of gels which have been made from soaps and other materials currently used for such purposes.

Fuels prepared by the practice of this invention also have utility in applications where the sloshing of fuels in storage tanks is a problem. Since the fuels are pumpable and yet viscous they may be used in liquid fuel rockets and jets, where the shift of weight concomitant with a sudden change in direction will seriously affect the trim of the vessel. The reduced tendency to splash and shift lessens the need for elaborate bulkheads and allows more payload.

In summary, the emulsions of this invention have an apparent rest viscosity of about 1,000 to 100,000 or more cps. such as 25,000 to 100,000 or more, for example, 40,000–100,000, but preferably 50,000–100,000 cps. Emulsions have been prepared having apparent rest viscosities of about 10,000, 20,000, 30,000, 40,000, 50,000, 60,000, 70,000 80,000, 90,000, 100,000 or greater.

The preferred embodiment of this invention comprises an emulsion consisting of a minor amount of an external phase and a major amount of an internal phase having a finely divided combustible solid dispersed within it. The choice of the solid is dictated primarily by specific impulse considerations. The usual practice of this invention would be to select a combination of liquid fuels and finely divided solids which are mutually non-reactive at storage temperatures and which yield potentially the maximum specific impulse. Specific impulse can be defined by the following equation.

The expression for specific impulse ($I_{sp}$), and the equations which lead to it are as follows ($Ft$=total impulse in lb.-sec. and $F=mc/g$):

$$I_{sp} = Ft/W = F/m = c/g$$

$$c = \sqrt{2_g R' \frac{T_c}{M} \frac{\nu}{\nu-1}\left[1-\left(\frac{p_e}{p_c}\right)^{\nu-1/\nu}\right]}$$

$$I_{sp} = \frac{1}{g}\sqrt{2_g R' \frac{T_c}{M} \frac{\nu}{\nu-1}\left[1-\left(\frac{p_e}{p_c}\right)^{\nu-1/\nu}\right]}$$

$$I_{sp} = 9.8\sqrt{\frac{T_c}{M} \frac{\nu}{\nu-1}\left[1-\left(\frac{p_e}{p_c}\right)^{\nu-1/\nu}\right]}$$

where:

$I_{sp}$=Specific impulse, pounds of thrust per pound weight of propellant burned per second.
$F$=Thrust, lb.
$t$=Duration of thrust due to burning, sec.
$W$=Total weight of propellant, lb.
$m$=Weight of propellant burned per second, lb./sec.
$c$=Effective exhaust velocity of propellant gases, ft./sec. (actual exhaust velocity of propellant gases in the case of rockets (but not for air-breathing jets), ft./sec.).
$g$=Acceleration due to gravity, ft./sec.$^2$.
$R'$=$RM$=Universal gas constant, 1544 ft.-lb./(lb.-mole) (° F.).
$R$=Gas constant per pound weight of propellant gases, ft.-lb./(lb.)(° F.).
$T_c$=Combustion chamber temperature, ° R.
$M$=Average molecular weight of propellant gases.
$\nu = C_p/C_y$.
$C_p$=Heat capacity of propellant gases at constant pressure, B.t.u./(lb.)(° F.).
$C_y$=Heat capacity of propellant gases at constant volume, B.t.u./(lb.)(° F.).
$P_e$=Pressure of propellant gases at nozzle exit, p.s.i.
$P_c$=Pressure of propellant gases in combustion chamber, p.s.i.

Having selected the best available combination fuels and solids and having calculated the optimum proportion of solids and fuel to be used, one selects a liquid for the external phase that is non-reactive with either the fuel or the finely divided solid is immiscible with the fuel and not a solvent for the solid fuel. Using the methods detailed elsewhere in these specifications, one then selects an appropriate emulsifier for the system. This emulsifier is then dissolved or dispersed in the external phase liquid and the mixture of solid and liquid fuels mixed into this liquid by any of the methods elsewhere described.

Examples of combustible solids elements which are of interest when combined with appropriate liquid fuels are lithium, beryllium, boron, carbon, sodium, magnesium, aluminum, silicon, etc. The hydrides or nitrides of the above elements, when they are solids, may be employed. These are employed as finely divided solids, for example a particle size of less than about 200 microns, such as less than about 100 microns, for example from about 0.5 to 50 microns, but preferably from about 1 to 10 microns.

The amount of finely divided solids added to the fuel can vary widely, such as from about 5 to 200 g. or more per 100 volumes of emulsions, for example from about 10 to 180, preferably from about 15 to 140, but usually from about 20 to 120.

The following examples are presented in non-limiting examples which illustrate the practice of this invention which finely divided solids are employed.

Example 78

To a 400 ml. beaker was added 10 ml. of water, 1 ml. of the emulsifier of Example 1, and 1 ml. of the product of Example 20 (Table II). These were mixed with a split disc stirrer driven by a Sergent stirrer motor until dissolved. Three hundred ml. of kerosene was then added slowly while stirring. The result was a smooth, white, viscous emulsion. This was divided into two parts. To half of the mixture was added 80 g. of powdered aluminum (Reynolds 400) while stirring vigorously. The result was a thick grey composition. Both the emulsion with the aluminum and the emulsion without the aluminum were equally stable. The aluminum powder showed no tendency to settle upon standing for long periods of time.

Example 79

A similar emulsion was prepared in the manner of Example 78, except that the emulsifier of Example 18, Table II and 60 g. of carbon black were employed in place of 80 g. of powdered aluminum.

Example 80

A similar emulsion was prepared in the manner of Example 78, employing 90 g. of powdered aluminum except that the emulsifier of Example 6, Table I, was employed.

Example 81

A similar emulsion was prepared in the manner of Example 78, employing 80 g. of powdered aluminum except that the emulsifier of Example 40, Table IV, was employed.

Example 82

A similar emulsion was prepared in the manner of Example 78, employing 80 g. of powdered aluminum except that the emulsifier of Example 46, Table IV, was employed.

The above examples are employed to illustrate the preparation of the emulsions of this invention containing combustible powdered solids which can be employed in jet and rocket fuels. However, it should be understood that powdered aluminum and other powdered solids can be similarly added to other emulsions prepared in accord with this invention, for example the emulsions described in the specific examples disclosed herein.

The emulsions of this invention can be employed in both mono-propellant and polypropellant systems. The emulsion can be employed to suspended oxidizing agents in the fuel. For example, an inorganic oxidizing agent such as a nitrate or a perchlorate may be incorporated therein in varying amounts.

One can readily prepare emulsions containing about 20% by volume of such oxidizers as nitrates, such as lithium nitrate, potassium nitrate, or hydrazine nitrate and the like, perchlorates, chlorates, chlorites, hypochlorites, dichromates, chromates and persulfates, such as the potassium, sodium and ammonium salts. Salts of other metals such as calcium, magnesium, aluminum and the like may also be employed.

The propellant mixture can comprise the fuel components containing finely divided oxidizers in proportions preferably such that the fuel is present in molal excess, i.e., an excess in the amount which would be consumed by the oxidizer in the propellant mixture would be from about 50–90% of that which would be required for complete combustion of the fuel although when desired proportions of oxidizer above the 90% can be employed, e.g., 100%.

The oxidizers may be of the formula $MA_y$ where $M$ is the cation such as $NH_4$ or a metal and $X$ represents the valency of $M$. The metal can be one of the metals of Group I–A, I–B, II–A, III–A, IV–A and VIII of the Periodic Table of elements.

For example to use perchlorates as an example $M(ClO_4)_x$ the perchlorates can be alkaline metal perchlorates such as the lithium, sodium, potassium, cesium, etc., perchlorates; magnesium, calcium, barium, iron, silver, thallium, etc., perchlorates.

Little is to be gained by a detailed description of the jet and rocket engines in which compositions of this type are burned. Recent details of the construction of such engines are not generally available due to security restrictions. A general description of the operation of rocket and jet engines is given in Encyclopedia of Chemical Technology, published by Interscience Publishers (1951), vol. 6, pages 954–959 under "Jet Propulsion Fuels" and in vol. 11, pages 760–778 under "Rocket Propellants."

A short description of the operation of jet engines is given in the same publication on page 954, and of rocket engines on pages 766–767 thereof and elsewhere. Since the compositions of this invention may be pumped and handled in the same manner as liquids they are used in the same types of engines as conventional liquid fuels. They possess the unique advantages of high density (due to the incorporated solids), stability, restartability, and high specific impulse.

Having thus described by invention, what I claim as new and desire to obtain by Letters Patent is:

1. A jet and rocket thixotropic hydrocarbon-in-water emulsion fuel comprising (1) water, (2) an emulsifiable hydrocarbon, and (3) an emulsifying agent, said hydrocarbon being present in said emulsion fuel in an amount of at least 80% hydrocarbon by volume of the emulsion, said emulsion having the characteristics of a solid fuel when at rest and the characteristics of a liquid fuel when a force is exerted on it, said emulsion tending to be nonadhesive, said emulsion having a critical shear point sufficient to permit pumping at high rates, and said emulsion having an apparent rest viscosity greater than about 1000 cps.

2. The jet and rocket thixotropic emulsion fuel of claim 1, also including finely divided combustible solids.

3. The jet and rocket thixotropic emulsion fuel of claim 1, also including finely divided aluminum particles.

4. The emulsion fuel of claim 1 wherein said hydrocarbon is present therein in an amount of at least 90% by volume of said emulsion.

5. The jet and rocket thixotropic emulsion fuel of claim 4, also including finely divided combustible solids.

6. The jet and rocket thixotropic emulsion fuel of claim 4, also including finely divided aluminum particles.

7. The method of providing jet and rocket power comprising burning the fuel of claim 1 in a reaction motor and utilizing the products of combustion as a source of power.

8. The method of providing jet and rocket power comprising burning the fuel of claim 2 in a reaction motor and utilizing the products of combustion as a source of power.

9. The method of providing jet and rocket power comprising burning the fuel of claim 3 in a reaction motor and utilizing the products of combustion as a source of power.

10. The method of providing jet and rocket power comprising burning the fuel of claim 4 in a reaction motor and utilizing the products of combustion as a source of power.

11. The method of providing jet and rocket power comprising burning the fuel of claim 5 in a reaction motor and utilizing the products of combustion as a source of power.

12. The method of providing jet and rocket power comprising burning the fuel of claim 6 in a reaction motor and utilizing the products of combustion as a source of power.

References Cited
UNITED STATES PATENTS

| | | | |
|---|---|---|---|
| 3,164,503 | 1/1965 | Gehrig | 149—18 |
| 3,242,019 | 3/1966 | Gehrig | 149—74 X |

BENJAMIN R. PADGETT, *Primary Examiner.*